United States Patent
Farkas

[11] 3,943,608
[45] Mar. 16, 1976

[54] BUNDLING STRAP

[75] Inventor: Paul Farkas, Hackensack, N.J.

[73] Assignee: Thomas & Betts Corporation, Elizabeth, N.J.

[22] Filed: Jan. 8, 1975

[21] Appl. No.: 539,517

[52] U.S. Cl. ............................................. 24/16 PB
[51] Int. Cl.² ......................................... B65D 63/00
[58] Field of Search........ 24/30.5 P, 30.5 R, 90 HA, 24/16 R, 16 PB, 73 PB, 17 AP, 17 B; 248/74 PB

[56] References Cited
UNITED STATES PATENTS

| | | | |
|---|---|---|---|
| 2,904,294 | 9/1959 | Marygold | 24/16 PB |
| 3,353,227 | 11/1967 | Kabel | 24/16 PB |
| 3,368,323 | 2/1968 | Wood | 24/16 PB UX |
| 3,442,732 | 5/1969 | Stensaker et al. | 24/16 PB UX |
| 3,447,995 | 6/1969 | Dankert et al. | 24/16 PB UX |
| 3,462,803 | 8/1969 | Horton | 24/90 HA UX |
| 3,514,815 | 6/1970 | Evans | 24/16 PB |
| 3,553,793 | 1/1971 | Long et al. | 248/74 PB X |
| 3,580,793 | 5/1971 | Hewitt | 24/90 HA UX |
| 3,593,383 | 7/1971 | Ellis | 24/16 PB |

Primary Examiner—Donald A. Griffin
Attorney, Agent, or Firm—David Teschner; Jesse Woldman

[57] ABSTRACT

A bundling strap specially constructed to be ultrasonically welded to form a locked loop about a plurality of articles to be bundled and a method for carrying out the welding. A central strap body is formed with at least one marginal strip joined to the central body portion along a marginal edge thereof, the marginal strip carrying an energy directing means to concentrate applied ultrasonic energy and produce a bond between such energy directing means and the overlying marginal strip. A method whereby the anvil remains outside of the strap loop permits the loop to be formed and the anvil to be easily later removed without affecting bundle tension.

10 Claims, 11 Drawing Figures

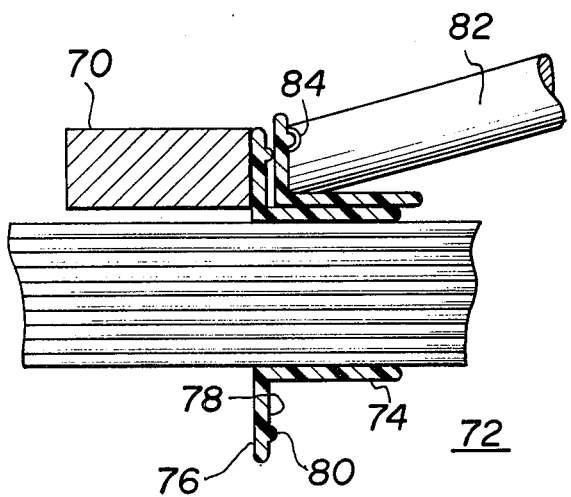
FIG. 5
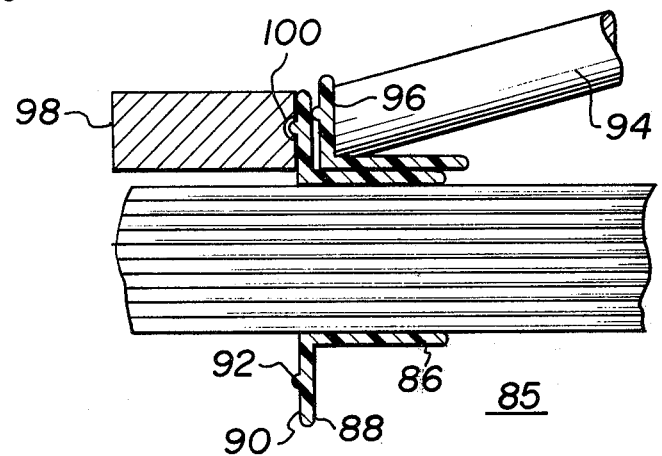
FIG. 6
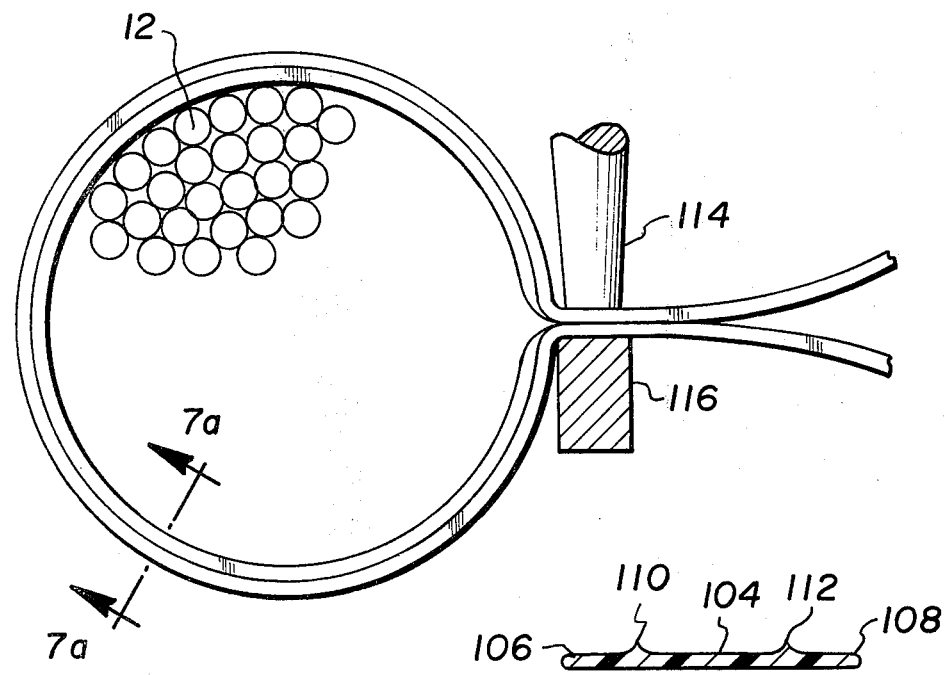
FIG. 7
FIG. 7A

BUNDLING STRAP

BACKGROUND OF THE INVENTION

1. Field of the Invention

The invention finds utility wherever articles are bundled together to make such articles easier to handle, use, ship or the like. In particular, the invention is useful in the bundling of individual conductors into cables of such conductors in order that harnesses of such conductors can be remotely fabricated and then moved to the installation site as is frequently done in the construction of aircraft and ships.

2. Description of the Prior Art

According to prior art techniques, the most common bundling straps have an apertured head at one end through which the tail end portion of the strap is passed along with a portion of the strap body until the desired tension is reached in the strap and bundle. Locking of the strap generally occurs by twisting the strap end beyond the head or by engaging a locking pawl with teeth in the strap body or the strap body directly. The result of either locking technique is to produce a projecting head which may be injurious to persons handling the bundles or the insulation of adjacent cables or equipment.

In an effort to diminish the potential problems caused by the projecting head of prior art straps, ultrasonic welding was resorted to. Such ultrasonic welding techniques requires an anvil to back up and support the articles to be welded and accordingly the anvil landed up inside the strap loop making it difficult to remove if high strap and bundle tension was required, and, more importantly, since it formed part of the bundle, its removal decreased the bundle tension. Attempts to omit the anvil result in the destruction of the insulation of conductors adjacent the ultrasonic weld.

SUMMARY OF THE INVENTION

The present invention overcomes the deficiencies noted above with respect to prior art bundling straps by providing a novel bundling strap useful with ultrasonic welding techniques which thereby eliminates the projecting heads of straps employing conventional locking techniques and a new arrangement of the welding components themselves whereby the drawbacks of present welding techniques are eliminated. To do this, a bundling strap is formed with a central body portion and at least one marginal strap attached to the central body portion at an obtuse, or right angle, thereto or as an extension of the central body portion if the same is formed along a curvilinear path. On the marginal strip interior or exterior surface, the one facing the articles to be bundled, is placed an energy directing means. This energy directing means will contact the opposite surface of the marginal strip as portions of the strap overlie one another when the strap ends are overlapped. The application of ultrasonic energy to the strap stack causes a joint to be formed at the energy directing means and the overlying marginal strips.

The method of welding employed positions the anvil outside of the bundle and in contact with one surface of the marginal strip, the horn of the ultrasonic energy generator contacting the top surface of the top member of the stack to create a bond or joint between the energy directing means and the overlying portions of the marginal strips. It is therefore an object of this invention to provide an improved bundling strap which can be joined by ultrasonic welding techniques.

It is another object of this invention to provide a bundling strap having one or more marginal strips to facilitate ultrasonic welding of the strap ends.

It is still another object of the invention to provide a bundling strip having one or more marginal strips, each marginal strip having energy directing means to facilitate ultrasonic welding of the strap ends.

It is yet another object of the invention to provide a method by which bundling strap ends can be ultrasonically welded without including any portion of the welding apparatus within the strap loop.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characters:

FIG. 5 is a front elevational view, in section, of another embodiment of the invention.

FIG. 6 is a front elevational view, in section, of still another embodiment of the invention.

FIG. 7 is a side elevational view of yet another embodiment of the invention.

FIG. 7a is a sectional view of the strap of FIG. 7 taken along the lines 7a—7a.

DESCRIPTION OF THE PREFERRED EMBODIMENTS

Figure 1:
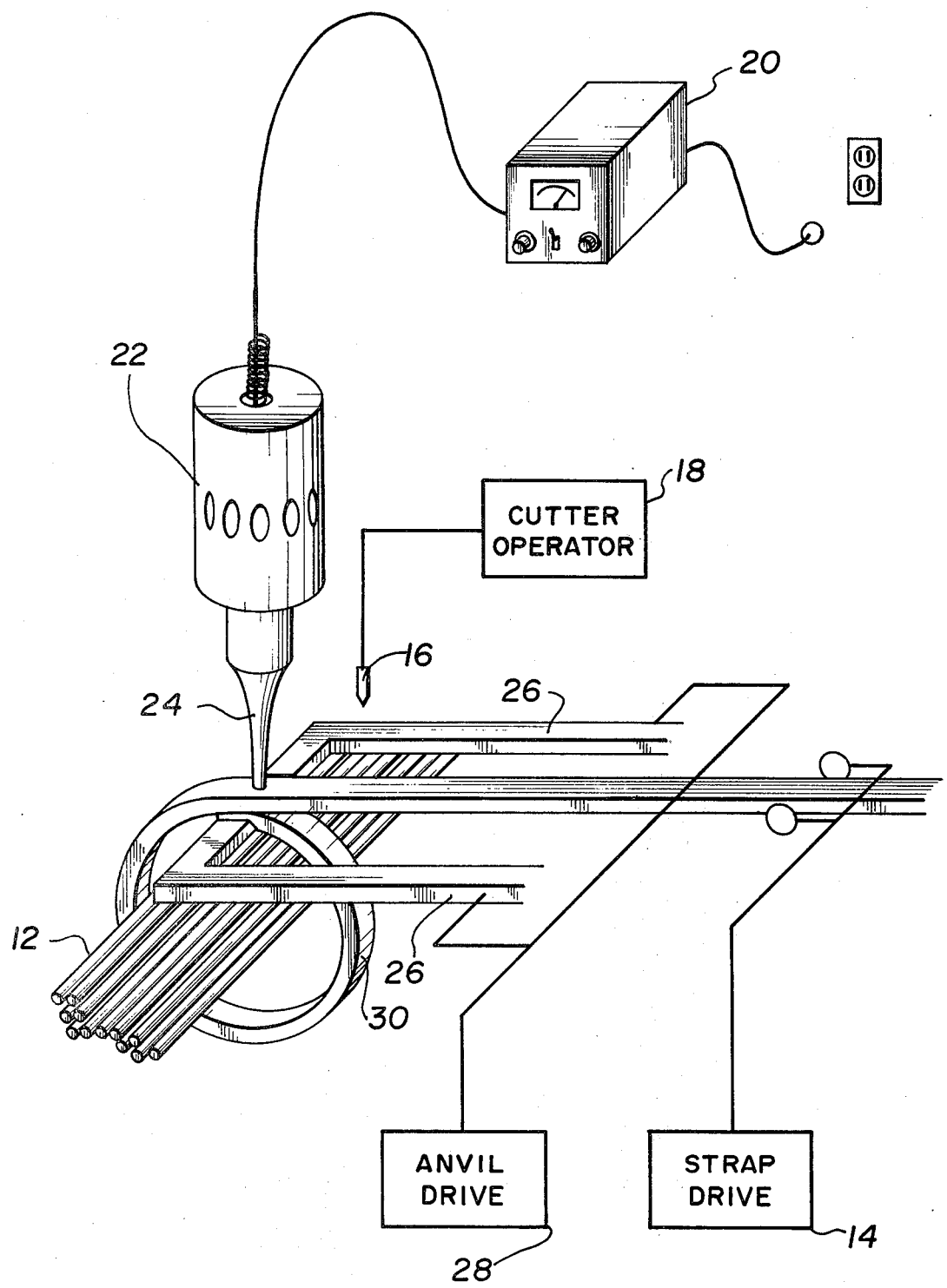
FIG. 1 is a diagrammatic representation of the ultrasonic welding apparatus employed according to the method of the invention.

Turning now to FIG. 1, there is shown an arrangement of the ultrasonic welding apparatus components which permit the method of the present invention to be practiced. A plurality of conductors 12 are to be bundled by means of a novel bundling strap 30, to be described in greater detail below. The bundling strap 30 is provided in a continuous web and it is looped about the conductors 12 and pulled tight by strap drive apparatus 14 well known in the prior art. When proper tension in the strap 30 is achieved, the welding operation is initiated such that the overlapped ends of the strap 30 are joined and the excess strap 30 is removed by a cutter 16 operated by a cutter operator 18 in a manner well known in the prior art. The welding is accomplished by a conventional ultrasonic generator 20 which drives an ultrasonic motor 22 whose energy is directed and focused by horn 24. Backing up the strap 30 stack is a two-part anvil 26 positioned by an anvil drive apparatus 28.

Figure 2:
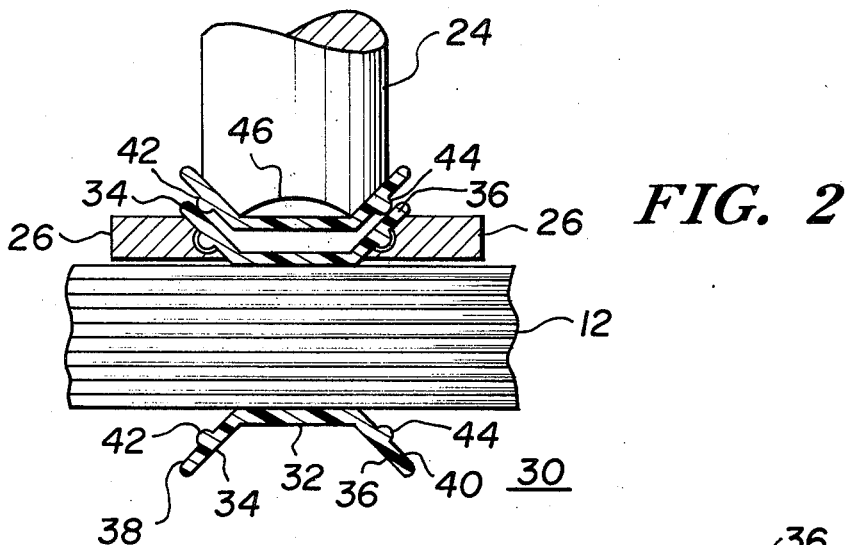
FIG. 2 is a front elevational view, in section, of a first embodiment of a bundling strap constructed in accordance with the concepts of the invention.
Figure 3:
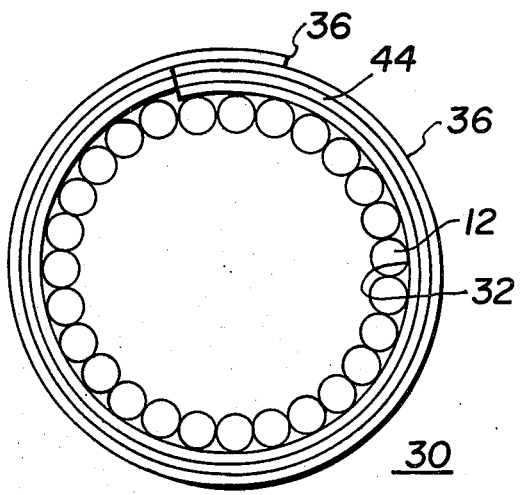
FIG. 3 is a side elevational view of the welded strap of FIG. 2.

Turning now to FIGS. 2 and 3, the basic concepts of the strap construction and the reason for the two-part anvil of FIG. 1 can be appreciated. Strap 30 has a central portion 32 and two marginal strips 34, 36 joined to the marginal edges of the central portion 32. On the exterior surfaces 38, 40 of the marginal strips 34, 36 respectively, that is, the surfaces closest to the conductors 12 to be bundled, are energy directing means 42, 44 respectively. The energy directors 42, 44, because of their small size as compared to the marginal strips 34, 36 and their pyramidal shape tend to concentrate the ultrasonic energy impressed by the horn 24. It should be noted that horn 24 is only permitted to contact the marginal strips 34, 36. Contact with central portion 32 is prevented by the hollow 46 in horn 24 to prevent the unwanted diffusion of the energy. The concentration in the tips of the energy directors 42, 44 causes them to be the first to melt and thus make a union with the underlying portions of the marginal strips 34, 36 respectively, when the ultrasonic motor 22 is de-energized. Only a surface bond is created between the energy directing means 42, 44 and the marginal strips 34, 36 respectively. Melting too much of the strap would allow it to stretch, thus removing the tension built up and the amount of energy required might also destroy the conductor 12 insulation.

The anvil 26, being in two parts, allows the separate portions to be moved in from the sides underlying the exterior surfaces 38, 40 of the marginal strips 34, 36 and back-up the strap 30 stack without being within the strap 30 loop. Thus, when the weld is complete, the anvil drive 28 can be operated to remove the anvil portions 26 without difficulty and without decreasing the bundle tension. In FIG. 3, the overlapped strap is shown about the conductors 12 when the weld has been completed.

Figure 4:
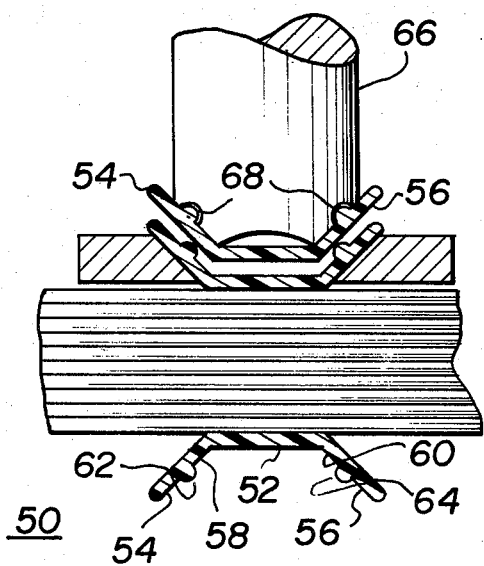
FIG. 4 is a front elevational view, in section, of a further embodiment of a bundling strap constructed in accordance with the concepts of the invention.

FIG. 4 shows a strap 50 similar in most details to strap 30 in FIG. 2. In this embodiment, the energy directing means 62, 64 are positioned on the interior surfaces 58, 60 of the marginal strips 54, 56 respectively. Again, the union is between the free tips of the energy directing means 62, 64 and the overlying marginal strips 54, 56 respectively. The horn 66 is notched as at 68 to accommodate the energy directing means 62, 64 on the overlapped part of the strap 50 without imparting to them any of the energy produced by the motor 22. The weld is created between the energy directing means 62, 64 of the bottom portion of strap 50 and the overlying marginal strips 54, 56 respectively.

In the embodiments of FIGS. 5 and 6, only a single anvil 70, 98 is required for the proper welding of straps 72 and 85. In FIG. 5, strap 72 has a central body portion 74 and a single marginal strip 76 formed at approximately a right angle to central body portion 74. On the interior surface 78 of the marginal strip 76 is formed an energy directing means 80. The anvil 70 is brought in contact with the exterior surface of the marginal strip 76 and the end of a first turn of the strip 72 is positioned adjacent the energy directing means 80. The horn 82, notched as at 84, to accept the energy directing means 80 of the first turn end of the strap 72, is then positioned against the interior surface 78 of the turn end and the weld made. In FIG. 6, the energy directing means 92 is placed on the exterior surface 90 of the marginal strip 88. The horn 94 is now solidly in contact with the interior surface 96 of the marginal strip 88 and the anvil 98 is notched as at 100 to receive the energy directing means 92 of the bottom turn of strap 85.

Where the extra height of the weld made outside the bundle can be accepted the simple arrangement of FIGS. 7 and 7a can be employed. The strap 102 is made with continuous marginal strips 106, 108 to either side of the central body portion 104, each having an energy directing means 110, 112 respectively. The strap 102 is looped about the conductors 12 and at the region of horn 114 and anvil 116 are offset so that the energy directing means 110, 112 contact the marginal strips 106, 108. The weld is then made as has be set forth above.

Figure 8:
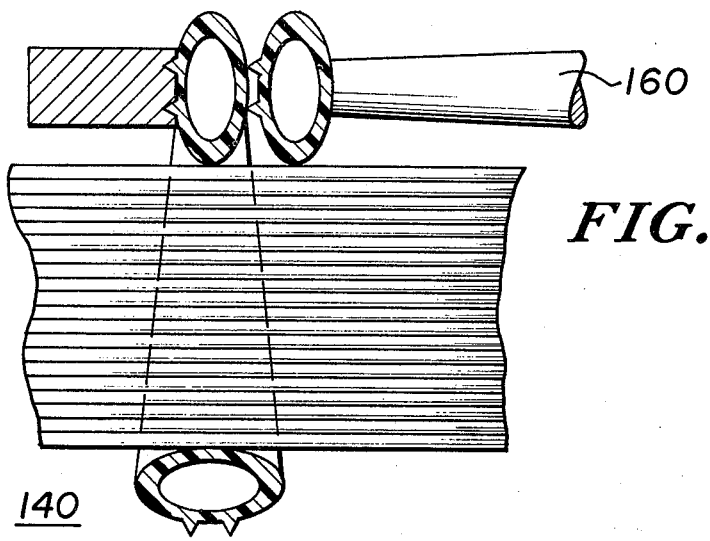
FIG. 8 is a front elevational view, in section, of yet another embodiment of the invention.
Figure 9:
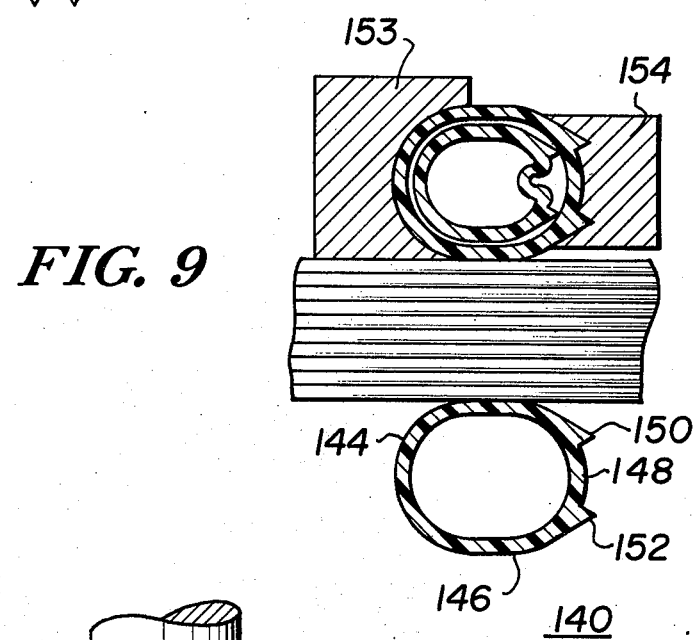
FIG. 9 is a front elevational view, in section, of still another embodiment of the invention.
Figure 10:
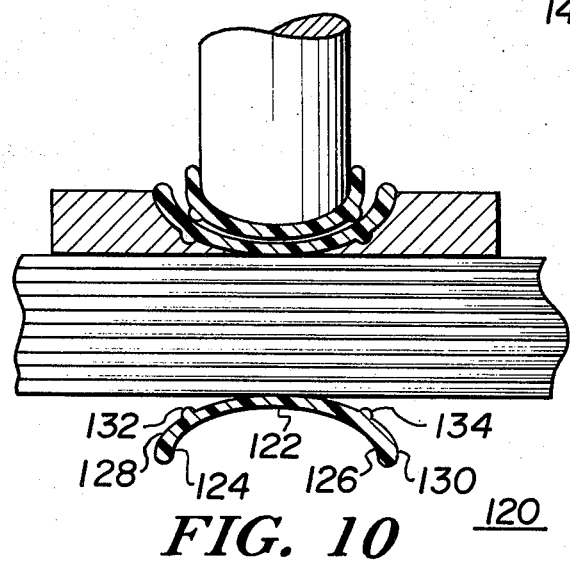
FIG. 10 is a front elevational view, in section, of still another embodiment of the invention.

Thus far the straps have been described as flat members, but curved or tubular forms of strap can also be used, as is shown in FIGS. 8, 9 and 10. Referring to FIG. 10, a strap 120 is shown having a central body portion 122 formed along a curvilinear line. The marginal strips 124, 126 extend from the edges of the central body portion 122, each marginal strip 124, 126 having an energy directing means 132, 134 on an exterior surface 128, 130 thereof. The operation of the strap 120 is similar to that described above. In FIG. 9, the ends of the marginal strips 144, 146 of strap 140 are joined to form a tubular member having energy directing means 150, 152 on the exterior surface 148 of the strap 140. One end of strap 140 is inserted within the opposite end and the weld made with an appropriately shaped horn 154 and anvil 153. The tubular strap 140 can also be used as shown in FIG. 8 where it is twisted in the area of the horn 160 and anvil 162 so that a side by side joint can be made as shown.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A bundling strap of the type whose ends are ultrasonically welded together to form a locked loop about a plurality of articles to be bundled the improvement comprising: a central body portion having a first edge and a second edge; at least one marginal strip coupled to one of said first and second edges; said marginal strip having an interior surface and an exterior surface, said exterior surface being positioned adjacent articles to be bundled; at least one energy directing means, one for each marginal strip and coupled to its associated marginal strip; said energy directing means contacting said marginal strip when a portion of said strip overlies a further portion of said strap after same has been looped about a plurality of articles to be bundled; said energy directing means forming a joint with said overlying marginal strip when said strap is subjected to ultrasonic welding energy.

2. A bundling strap as defined in claim 1, wherein said energy directing means is located on said marginal strip exterior surface.

3. A bundling strap as defined in claim 1, wherein said energy directing means is located on said marginal strip interior surface.

4. A bundling strap as defined in claim 1, wherein said marginal strip is joined to said central body portion at right angles thereto.

5. A bundling strap as defined in claim 1, wherein there are two marginal strips, a first marginal strip coupled to said first edge of said central body portion and a second marginal strip coupled to said second edge of said central body portion; a first energy directing means being coupled to said first marginal strip and a second energy directing means being coupled to said second marginal strip; said first energy directing means contacting said first marginal strip and said second energy directing means contacting said second marginal strip when a portion of said strap overlies a further portion of said strap after same has been looped about a plurality of articles to be bundled; said first energy directing means forming a joint with said overlying first marginal strip and said second energy directing means forming a joint with said overlying second marginal strip when said strap is subjected to ultrasonic welding energy.

6. A bundling strap as defined in claim 5, wherein said first and said second energy directing means are located on said exterior surfaces of said first and second marginal strips respectively.

7. A bundling strap as defined in claim 5, wherein said first and said second energy directing means are located on said interior surfaces of said first and second marginal strips respectively.

8. A bundling strap as defined in claim 5, wherein said first and second marginal strips are joined to said central body portion at oblique angles to said central body portion.

9. A bundling strap as defined in claim 5, wherein said central body portion is formed with a curvilinear cross section between said first and second edges thereof and said first and second marginal strips are joined to said first and second edges so as to provide extensions of said central portion along the curvilinear path of said central body portion.

10. A bundling strap as defined in claim 5, wherein the free ends of said first and second marginal strips are joined to form said strap into a tubular member.

* * * * *